US009804267B2

(12) United States Patent
Van Den Bossche

(10) Patent No.: US 9,804,267 B2
(45) Date of Patent: Oct. 31, 2017

(54) SYSTEM AND METHOD FOR DETERMINING THE POSITION ERROR OF A SATELLITE LOCALIZATION RECEIVER

(71) Applicant: THALES, Neuilly-sur-Seine (FR)

(72) Inventor: Mathias Van Den Bossche, Goyrans (FR)

(73) Assignee: THALES, Courbevoie (FR)

(*) Notice: Subject to any disclaimer, the term of this patent is extended or adjusted under 35 U.S.C. 154(b) by 455 days.

(21) Appl. No.: 14/550,818

(22) Filed: Nov. 21, 2014

(65) Prior Publication Data

US 2015/0145723 A1 May 28, 2015

(30) Foreign Application Priority Data

Nov. 22, 2013 (FR) .................................... 13 02697

(51) Int. Cl.
*G01S 19/13* (2010.01)
*G01S 19/08* (2010.01)
*G01S 19/20* (2010.01)

(52) U.S. Cl.
CPC .............. *G01S 19/13* (2013.01); *G01S 19/08* (2013.01); *G01S 19/20* (2013.01)

(58) Field of Classification Search
CPC ........... G01S 19/13; G01S 19/08; G01S 19/20
USPC .................................................. 342/357.51
See application file for complete search history.

(56) References Cited

U.S. PATENT DOCUMENTS

| 6,337,657 B1* | 1/2002 | Zhodzishsky | ........... G01S 19/43 342/357.31 |
|---|---|---|---|
| 2011/0025558 A1 | 2/2011 | Levy | |
| 2012/0038511 A1* | 2/2012 | Frankenberger | ........ G01S 19/08 342/357.58 |

FOREIGN PATENT DOCUMENTS

| WO | 2004029807 A2 | 4/2004 |
|---|---|---|
| WO | 2009112483 A1 | 9/2009 |

OTHER PUBLICATIONS

Todd Walter, et al., "Future Architectures to Provide Aviation Integrity", Proceedings of the 2008 National technical Meeting of the Institute of Navigation, Jan. 30, 2008, pp. 394-401, The Institute of Navigation, Manassas, VA, USA, XP056005159.
Todd Walter, et al., "Vertical Protection Level Equations for Dual Frequency SBAS", Proceedings of the 23rd International technical Meeting of the Satellite Division of the Institute of navigation (ION GNSS), Sep. 24, 2010, pp. 2031-2041, the Institute of Navigation, Manassas, VA, USA, XP056000313.
John E. Angus, "Toward Computation of Exact Horizontal Protection Limits for Satellite-Based Navigation Systems", Navigation, Dec. 1, 1999, pp. 217-226, vol. 46, No. 3, Institute of Navigation, Fairfax, VA, USA, XP056004337.

(Continued)

*Primary Examiner* — Harry Liu
(74) *Attorney, Agent, or Firm* — Baker & Hostetler LLP

(57) ABSTRACT

A system and method are provided for determining a distribution of a position error of a receiver of localization signals, the signals being sent by at least one satellite. The system includes the receiver, one position of which is known as first position and is affected by an error, known as first error, having a distribution, known as first distribution, a first device for determining positions of the satellite(s), known as second positions, a device for transmitting the second position of the first determination device to the receiver, and the first distribution is defined by at least one first cumulant, of higher-than-second order.

8 Claims, 1 Drawing Sheet

(56) References Cited

OTHER PUBLICATIONS

P.B. Ober, "Accuracy and Integrity of Nonlinear System", Proceedings of the 12th International Technical Meeting of the Satellite Division of the Institute of Navigation (ION GPS), Sep. 17, 1999, pp. 1211-1216, The Institute of Navigation, Manassas, VA, USA, XP056002992.

\* cited by examiner

SYSTEM AND METHOD FOR DETERMINING THE POSITION ERROR OF A SATELLITE LOCALIZATION RECEIVER

CROSS-REFERENCE TO RELATED APPLICATION

This application claims priority to foreign French patent application No. FR 1302697, filed on Nov. 22, 2013, the disclosure of which is incorporated by reference in its entirety.

FIELD OF THE INVENTION

The invention concerns the field of satellite positioning. In particular it concerns the determination of a positioning error that a receiver produces when using a satellite localization system. These systems are for example implemented in systems for improving the accuracy of the localization supplied by the GPS (Global Positioning System). These systems are also referred to as localization augmentation systems. They are also known by the acronym SBAS for Satellite-Based Augmentation Systems. The system EGNOS, an acronym for European Geostationary Navigation Overlay Service, is another known GPS augmentation system.

BACKGROUND

Knowing this positioning error of the receiver makes it possible to determine a volume for which the probability of presence of the receiver is above a threshold set by a standard. Knowing this volume thus makes it possible, for example, to determine the minimum distance at which two aircraft must not come closer to each other. Knowing this information is in particular necessary for integrity services. The term integrity service refers to the capability of a system to supply an alert to the pilot when the navigation system can no longer be used with the requisite performance in terms of user risk.

These error determination systems may be used in aircraft but also in ground vehicles or ships, for example.

Systems are known in the prior art in which information representing the positions of the satellites, and times of passage through the ionosphere as well as information representing the error on these positions and these times of passage are sent to the various receivers. Knowing this information makes it possible to determine the position error of the receiver, also referred to as the integrity of the position of the object located by the receiver.

It is known in the prior art that the items of information representing errors are marginal standard deviations ($\sigma_i$) of the distributions of the errors committed. Thus the error distribution is modelled by a centred Gaussian law of the form $N(0, \sigma_i^2)$. However, the modelling of the error distribution in the form of a centred Gaussian law is too coarse, and leads to the need for a safety margin to be applied, which is in some cases too large. This is particularly the case when the combination of the marginal standard deviations ($\sigma_i$), of the position error of each satellite used, must be small to allow sufficient accuracy for the performance of the maneuvers to be executed. In such cases, the margin, chosen to cover the lack of fit of a model based on centred Gaussians, too frequently makes the service unavailable. It has also been possible to demonstrate that the use of centred Gaussians is only correct from a mathematical point of view if one can posit the hypothesis that the errors are distributed in a unimodal and symmetrical way, which is in no way guaranteed as a general rule.

SUMMARY OF THE INVENTION

The present invention aims to remedy these problems by providing a system for determining the position error of a receiver whose accuracy is increased in relation to the accuracy of systems based on the exchange of marginal standard deviations of the distribution of the error on the position of the satellites.

According to an aspect of the invention, a system is suggested for determining a distribution of a position error of a receiver of localization signals, the signals being sent by at least one satellite. The system includes:
  the receiver, one position of which is known as first position and is affected by an error, known as first error, having a distribution, known as first distribution;
  a first device for determining at least one position of the or each or at least one satellite, known as second position,
  a device for transmitting the or each or at least one second position of the first determination device to the receiver.

The system is characterized in that
  the first distribution is defined by at least one first cumulant, of higher-than-second order,
  the first device is furthermore adapted for determining at least one second cumulant, of higher-than-second order, representing a second distribution of a second error on the second position,
  the transmission device is furthermore adapted for transmitting the or each or at least one second cumulant of the first determination device to the receiver,
  and in that the receiver includes:
    a second device for determining the or each or at least one first cumulant, on the basis of the second position, the second cumulant and a model for determining the first position of the receiver from distances between the receiver and the satellite(s) and
    a third device for determining the first distribution, from said first cumulant.

The first and second cumulants of higher-than-second order can also be referred to by the expression "series of cumulants" or "set of cumulants".

The cumulants $\kappa_n$ of the random variable X are defined by the cumulant generating function $g(t)$:

$$g(t) = \ln(\langle e^{iXt}\rangle_X) = \sum_{n=0}^{\infty} \frac{(it)^n}{n!}\kappa_n$$

In this equation $\langle\ \rangle_X$ represents the mathematical expectation of the random variable X and $\kappa_n$ the $n^{th}$ order cumulant.

The system therefore allows the transmission to the receivers of satellite signals of an item of information representing the distribution of the position error of the satellites. In addition, the use of this information makes it possible to determine the positioning error that the receiver produces by using the satellite localization system.

In addition, the use of the cumulants makes it possible to transmit to the users an item of information representing the distribution of the position error of the satellite that is more reliable than in the case of the systems known in the prior art. The use of these cumulants then obviates the need for applying so many margins in the position, for two reasons:

It makes it possible to describe the distributions of positioning/synchronization error of the positioning signal sources in more detail, and due to this fact makes it possible to improve the accuracy of the localization information computed by the receiver. The region of tolerance to the integrity risk can be smaller than in current solutions.

It makes it possible to avoid having to form a hypothesis with a false mathematical basis, and which consists in modelling the errors committed for the position of each satellite by a combination of centred Gaussians $N(0, \sigma_i^2)$, whereas the distribution is not unimodal or symmetrical.

In other words, the form of the distribution allowed by the invention is much more accurate than a centred Gaussian distribution. However, this generic form can be described by a few parameters only, the cumulants. It is therefore possible to transmit much more detailed information on the probability distribution of the second positioning errors of the satellites.

This accurate information then makes it possible to model the first position errors of the receiver in as reliable a manner as possible. Thus, it is not necessary to apply large safety margins to ensure safety, and it is possible to use the localization system to perform maneuvers in which the demand for accuracy is high.

According to a technical feature the second determination device is adapted for applying the model to the second cumulant(s).

According to a technical feature the first determination device is furthermore adapted for determining the second cumulants of first to fifth order, and in which the second determination device is furthermore adapted for determining the first cumulants of first to fifth order.

The larger the number of cumulants the more accurate the modelling will be, but a larger number of cumulants are more complicated to measure experimentally.

According to a technical feature the third device is furthermore adapted for using an Edgeworth expansion.

The invention also concerns a method for determining a distribution of a position error of a receiver of localization signals, the signals being sent by at least one satellite. The method includes:
  a step of reception, by a receiver, of the satellite localization signals, one position of the receiver being known as first position and is affected by an error, known as first error, having a distribution, known as first distribution,
  a first step of determination, by a first determination device, of at least one position of the or each or at least one satellite, known as second positions,
  a step of transmission, by a transmission device, of the or each or at least one second position of the first determination device to the receiver.

The method is characterized in that
  the first distribution is defined by at least one first cumulant, of higher-than-second order,
  the first determination step is furthermore adapted for determining at least one second cumulant, of higher-than-second order, representing a second distribution of a second error on the second position,
  the transmission step is furthermore adapted for transmitting the or each or at least one second cumulant, associated with said second position of the first determination device to the receiver,
  in addition the method includes:
    a second step of determination, by a second determination device of said receiver, of the or each or at least one first cumulant, on the basis of the second position, the second cumulant and a model for determining the first position of the receiver from distances between the receiver and the satellite(s) and
    a third step of determination, by a third determination device of the receiver, of the first distribution, from the first cumulant.

According to a technical feature the second determination step is adapted for applying the model to the second cumulant(s).

According to a technical feature the first determination step is furthermore adapted for determining the second cumulants of first to fifth order, and in which the second determination step is furthermore adapted for determining the first cumulants of first to fifth order.

According to a technical feature the third determination step is furthermore adapted for using an Edgeworth expansion.

BRIEF DESCRIPTION OF THE DRAWINGS

The invention will be better understood, and other advantages will become apparent, upon reading the detailed description, given by way of non-limiting example. This detailed description is made using the following FIGURES.

DETAILED DESCRIPTION

Figure 1:
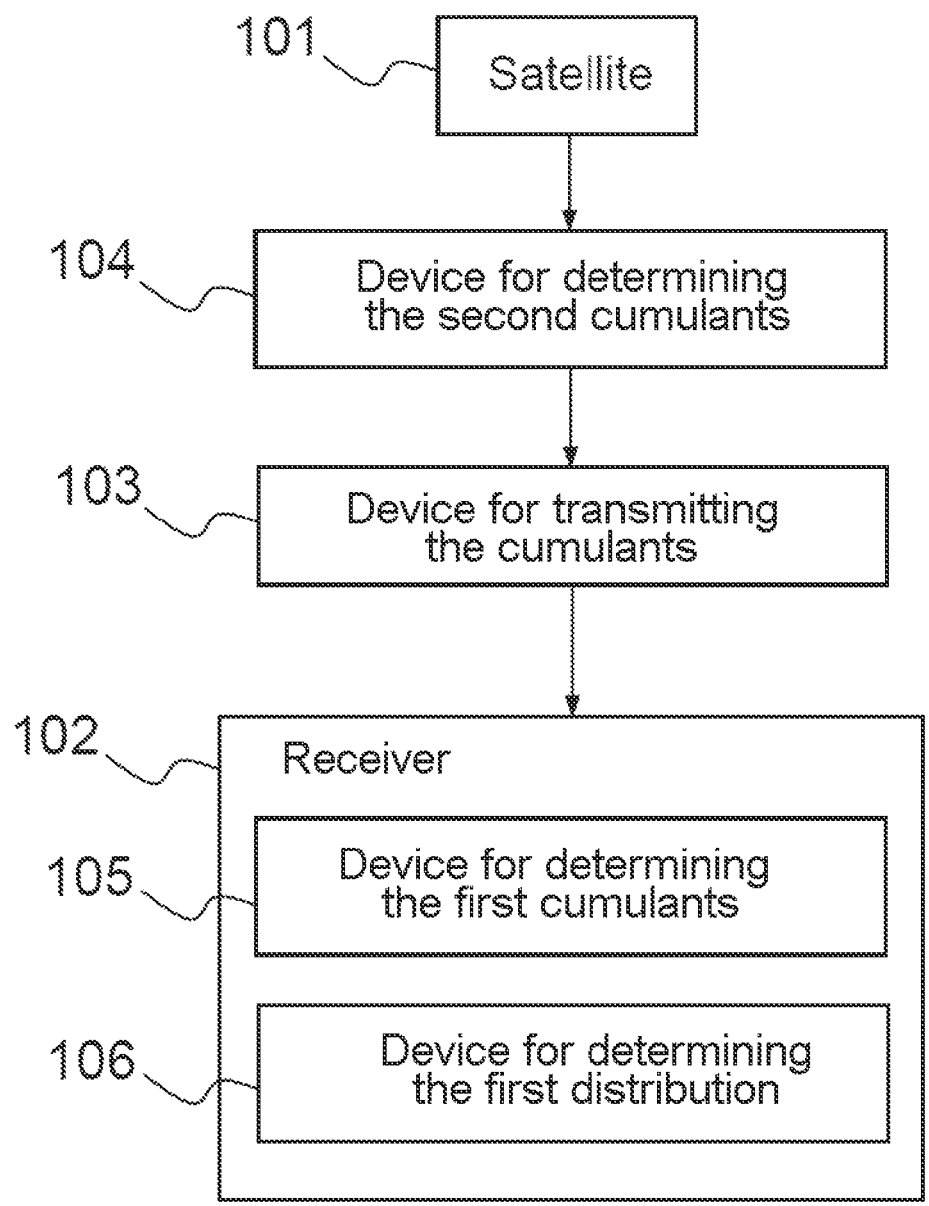
FIG. 1 shows a first embodiment of the system shown in this invention.

FIG. 1 shows the system including a satellite 101 and a receiver of satellite signals 102. The system allows the receiver to determine the distribution of a first error associated with a first position of the receiver. This first distribution of the first error is modelled by at least one first set of cumulants of higher-than-second order.

In order to perform this determination, the system allows the transmission (via a transmission device 103) of second cumulants that represent a second distribution representing a second error associated with the second position of a satellite. The determination of these elements is performed by a first determination device 104.

The first cumulants are determined by the receiver using a second determination device 105.

Finally a third device 106 enables the determination of the first distribution, from the first cumulants.

This modelling is based on the use of the Edgeworth expansion of the probability density of the error associated with the position of a satellite.

The cumulants of a random variable X distributed according to a probability density f (note that X~f) are determined by introducing the function $\phi(t) = \langle e^{iXt} \rangle_X$.

e represents the exponential function $\langle \ \rangle_X$ represents the mean on the values of X i being the imaginary unit ($i^2 = -1$).

It will be noted that the expansion of this function, as a function of the powers of the exponent, is a series that involves the $n^{th}$-order moments of f: $\mu_n = \langle X^n \rangle$.

$$\varphi(t) = \sum_{n=0}^{\infty} \frac{(it)^n}{n!} \mu_n$$

It is also possible to carry out the expansion of the function $\ln(\langle e^{iXt} \rangle_X)$, in which case a set of coefficients $\kappa_n$ is obtained, which are defined in the following manner:

$$\ln(\langle e^{iXt} \rangle_X) = \sum_{n=0}^{\infty} \frac{(it)^n}{n!} \kappa_n$$

Each $\kappa_n$ thus defined is the $n^{th}$-order cumulant of the distribution f. The two first cumulants are the mean and the variance of the distribution.

In addition, if X and Y are two random variables distributed according to f and g respectively, and whose $n^{th}$-order cumulants are $\kappa_n[f]$ and $\kappa_n[g]$ respectively, then the $n^{th}$-order cumulants of the distribution h associated with the random variable Z=pX+qY, are given by:

$$\kappa_n[h] = p^n \kappa_n[f] + q^n \kappa_n[g]$$

In addition it is known that any distribution that results from the combination of m random variables can be represented by an expansion, known as the Edgeworth expansion and having the following form:

$$F_n(x) = \left[1 + \sum_{j=1}^{\infty} \frac{1}{n^{j/2}} P_j(\kappa_1, \ldots, \kappa_j, x)\right] \Psi(x)$$

In this equation the variables are as follows:
$\Psi(x)$ is a reference function according to choice (Gaussian for example)
$\kappa_p$ is the $p^{th}$-order cumulant of the distribution of the orbit and/or clock errors
$P_j$ is a polynomial of order 3j in x, which involves the j first $\kappa_p$s in its coefficients, and the expression of which depends on the choice of $\Psi(x)$.
n represents the number of variables combined to obtain x In addition, it is known that this expansion converges as n approaches $\infty$.

Based on the mathematical concepts above, the invention provides the determination of the first position error of the receiver as follows:
  a transmission device 103 supplies the information on the distribution of the position and synchronization errors of the satellites in the form of cumulants of higher-than-second order of this distribution. This transmission is performed for each of the $N_S$ positioning signal sources (for example satellites emitting a signal observing the GPS standard)
  the receiver determines its position and a reference time using a linear combination of measurements of (pseudo-)distances $\rho_j$ made between its antenna and the $N_S$ signal sources used for the positioning
  the receiver determines the m first cumulants ($\kappa_n$) of the first distribution of the error associated with its position, from the transmitted cumulants $\kappa_{i,j}$, using the following relationship:

$$K_{n,p} = \sum_{j=1}^{N_S} (M_{p,j})^n \kappa_{n,j}$$

With n=1, . . . , m representing the order of the cumulant, j the satellite, $M_{p,j}$ the coefficient p,j of the matrix that makes it possible to determine the second position of the receiver on the basis of the distances between the receiver and the satellites, p represents the direction (x, y or z) for which the cumulant is determined.

In one embodiment, it is possible to use the least squares method to determine the matrix $M_{p,j}$. In this embodiment the vector of the distances between the receiver and the satellites is modelled as follows:

$$\rho = \hat{G}X + \epsilon$$

In this equation $\rho = [\rho_1 \ldots \rho_{N_S}]$ is the vector of the distances between the receiver and the satellites, $\epsilon = [\epsilon_1 \ldots \epsilon_{N_S}]$ is the vector of the errors of the distances between the receiver and the satellites and $X = [x, y, z, \Delta t_{usr}]$ is the vector of the second position and of the clock shift of the receiver and $$G = \begin{bmatrix} e_x e_1 & e_y e_1 & e_z e_1 & c \\ \vdots & \vdots & \vdots & \vdots \\ e_x e_{N_S} & e_y e_{N_S} & e_z e_{N_S} & c \end{bmatrix}$$

is the observation matrix of the problem. In the matrix $\hat{G}$, c represents the speed of light and $e_x e_j$ is the cosine of the angle between the vector in the direction x and the vector towards the satellite j.

Using the least squares method, the relationship between the second position of the receiver and the distances between the receiver and the satellites can be written $X_{est} = (\hat{G}^t \hat{C}^{-1} \hat{G})^{-1} \hat{G}^t \hat{C}^{-1} \rho$.

In this relationship $\hat{C} = \langle \epsilon \epsilon^t \rangle$ is the error correlation matrix. In this embodiment it can then be determined that $M = (\hat{G}^t \hat{C}^{-1} \hat{G})^{-1} \hat{G}^t \hat{C}^{-1}$.

Using the Edgeworth expansion truncated to the $m^{th}$ order, which involves the first cumulants $K_n$, the first distribution F that approaches the distribution of the first error associated with the positioning of the receiver is determined.

Finally, this distribution of the first error can be used to determine the dimension of a trust region (i.e. a region in which the probability of finding the receiver is greater than or equal to a determined threshold). It is possible to find this trust region by solving the following equation.

$$\int_{-\infty}^{-R_p} F(x) dx + \int_{R_p}^{\infty} F(x) dx = P_{HMI}$$

This determination must be carried out for each direction in space (vertical, horizontal). $P_{HMI}$ represents the tolerated probability of non-integrity, in order to ensure that these $R_p$s are smaller than the dimensions of the tolerance region (for example the alert radii used in civil navigation).

It is also possible to directly find the risk of being found outside the requisite tolerance region ($R_a$), and for this the following equation can be used:

$$\int_{-\infty}^{-R_a} F(x)dx + \int_{R_a}^{\infty} F(x)dx < P_{HMI}$$

The system as presented in this invention necessitates certain pre-requisites before being used. In particular, it is necessary that:

the order of the expansion used to determine the first distribution must be known in advance by the receiver and the satellite(s)

the computation of the second cumulants must be done in such a way that the level of trust of their estimate is consistent with the probability of non-integrity demand required for the overall system. It is also necessary that the resulting approximation remain conservative, i.e. that one is sure that the cumulants have not been undervalued.

finally, it is necessary that the reference function $\Psi(x)$ be also known in advance by the satellite and the receiver.

In another embodiment of the system the latter uses the knowledge of the cumulants up to the fourth or fifth order, associated with the position error of each satellite, and/or with the error on the time of passage of the signal of each satellite through the ionospheric layer.

This computation of the error distribution is based on a combination of the statistical calibrations that are carried out over a long period and on contributions arriving within a short period. The latter are more reactive and are based for example on the observation of the position/synchronization/ionospheric delay computations.

The broadcasting of the cumulants to the receivers is performed with an alert device and/or by re-updating the values of the cumulants in the case where they have turned out to be poorly fitted to the integrity requirements following a change in the state of the system.

The distribution of the first errors is produced using the broadcast cumulants and modelling the reference function $\Psi$ as a Gaussian centred on the first first-order cumulant and of the width of the first second-order cumulant.

Next it is possible to evaluate the availability of the service and therefore the region in which probability of the receiver being present exceeds a threshold using the preceding equations.

The first device 104 for determining the positions of the satellite(s) can be located on the ground or in one of the satellites.

The various determination devices described in this invention can be computers or processors programmed in such a way as to produce the various operations performed by the devices. It is also possible to use dedicated components, programmable logic circuits, programmable logic networks (also known by the acronym FPGA for Field-Programmable Gate Array) or integrated circuits specific to one application (also known by the acronym ASIC for Application-Specific Integrated Circuit) programmed in such a way as to produce the various operations performed by the devices.

The present invention can also be implemented from hardware and software elements. It can be available as a computer program product on a computer-readable medium. The medium can be electronic, magnetic, optical, electromagnetic or be an infra-red type broadcasting medium. Such media are, for example, semi-conductor memories (Random Access Memory RAM, Read-Only Memory ROM), tapes, diskettes or magnetic or optical disks (Compact Disk-Read Only Memory (CD-ROM), Compact Disk-Read/Write (CD-R/W) and DVD).

The invention claimed is:

1. A system for determining a distribution of a position error of a receiver of localization signals, said signals being sent by at least one satellite, said system comprising:
    said receiver, having a first position and being affected by a first error, having a first distribution;
    a first determination device for determining at least one position of said at least one satellite, being a second position,
    a transmission device for transmitting said second position from said first determination device to said receiver,
    said first distribution being defined by at least one first cumulant which is of higher-than-second order,
    said first determination device being configured for determining at least one second cumulant which is of higher-than-second order, representing a second distribution of a second error on said second position,
    said transmission device being configured for transmitting said at least one second cumulant from said first determination device to said receiver,
    wherein said receiver includes:
        a second determination device for determining said at least one first cumulant, on the basis of said second position, of said second cumulant and of a model for determining said first position of the receiver from distances between said receiver and said at least one satellite, and
        a third determining device for determining said first distribution, from said at least one first cumulant.

2. The system of claim 1, wherein said second determination device is adapted for applying said model to said at least one second cumulant.

3. The system of claim 1, wherein said first determination device is furthermore adapted for determining cumulants of first to fifth order, and in which said second determination device is furthermore adapted for determining cumulants of first to fifth order.

4. The system of claim 1, wherein said third device is furthermore adapted for using an Edgeworth expansion.

5. A method for determining a distribution of a position error of a receiver of localization signals, said signals being sent by at least one satellite, said method including;
    a reception step comprising receiving, by a receiver, said satellite localization signals, a position of said receiver being a first position and being affected by a first error, having a first distribution,
    a first determination step comprising determining, by a first determination device, at least one position of said at least one satellite, being a second position,
    a transmission step comprising transmitting, by a transmission device, said second position from said first determination device to said receiver,
    said first distribution being defined by at least one first cumulant which is of higher-than-second order,
    wherein the first determination step also comprises determining at least one second cumulant which is of higher-than-second order, representing a second distribution of a second error on said second position,
    wherein said transmission step also comprises transmitting said at least one second cumulant, associated with said second position from said first determination device to said receiver,
    said method also including:
        a second determination step comprising determining, by a second determination device of said receiver, said at least one first cumulant, on the basis of said second position, of said second cumulant and of a model for determining said first position of said receiver from distances between said receiver and said at least one satellite, and a third determination step comprising determining, by a third determination device of said receiver, said first distribution, from said at least one first cumulant.

6. The method of claim 5, wherein said second determination step comprises applying said model to said at least one second cumulant.

7. The method of claim 5, wherein said first determination step comprises determining cumulants of first to fifth order, and in which said second determination step comprises determining cumulants of first to fifth order.

8. The method of claim 5, wherein said third determination step comprises using an Edgeworth expansion.

* * * * *